United States Patent
Leung

(10) Patent No.: US 6,182,509 B1
(45) Date of Patent: Feb. 6, 2001

(54) ACCELEROMETER WITHOUT PROOF MASS

(75) Inventor: Albert M. Leung, Burnaby (CA)

(73) Assignee: Simon Fraser University, Burnaby (CA)

(*) Notice: Under 35 U.S.C. 154(b), the term of this patent shall be extended for 0 days.

(21) Appl. No.: 09/177,439

(22) Filed: Oct. 21, 1998

Related U.S. Application Data

(63) Continuation-in-part of application No. 08/673,733, filed on Jun. 26, 1996.

(51) Int. Cl.⁷ .................................................... G01P 15/00
(52) U.S. Cl. ................................. 73/514.05; 73/514.09; 73/514.33
(58) Field of Search ........................... 73/514.09, 514.03, 73/504.05, 504.06, 504.07, 654; 33/366; 280/735; 188/181 A

(56) References Cited

U.S. PATENT DOCUMENTS

| | | |
|---|---|---|
| 2,440,189 | 4/1948 | Zworykin . |
| 2,455,394 | 12/1948 | Webber . |
| 2,650,496 | 9/1953 | Middleton et al. . |
| 2,709,365 | 5/1955 | Piety . |
| 2,726,546 | 12/1955 | King, Jr. . |
| 2,947,938 | 8/1960 | Bennett . |
| 3,114,261 | 12/1963 | Dillon et al. . |
| 3,241,374 | 3/1966 | Menkis . |
| 3,247,723 * | 4/1966 | Yavne ................................. 73/514.09 |
| 3,429,178 | 2/1969 | Durbin . |
| 3,677,085 | 7/1972 | Hayakawa . |
| 3,800,592 | 4/1974 | Jones, Jr. . |
| 3,881,181 | 4/1975 | Khajezadeh . |
| 3,975,951 | 8/1976 | Kohama et al. . |
| 3,992,940 | 11/1976 | Platzer, Jr. . |
| 3,995,481 | 12/1976 | Djorup . |
| 3,996,799 | 12/1976 | van Putten . |
| 3,998,928 | 12/1976 | Stendel et al. . |
| 4,232,553 * | 11/1980 | Benedetto et al. ................. 73/514.03 |

(List continued on next page.)

FOREIGN PATENT DOCUMENTS

| | | |
|---|---|---|
| 0664 456 A1 | 7/1995 | (EP) . |
| 0 674 182 A2 | 9/1995 | (EP) . |

OTHER PUBLICATIONS

Frank Goodenough, "Airbags Boom When IC Accelerometer Sees 50 G", Electronic Design, Aug. 8, 1991.

Euisik Yoon and Kensall D. Wise, "An Integrated Mass Flow Sensor With On–Chip CMOS Interface Circuitry", IEEE Transactions on Electron Devices, vol. 39, No. 6, Jun. 1992.

Theresa A. Core, W.K. Tsang, and Steven J. Sherman, "Fabrication Technology For An Intergrated Surface–Micromachined Sensor", Solid State Technology, Oct. 1993.

Bill Riedel, "A Surface–Micromachined, Monolithic Accelerometer", Analog Dialogue, vol. 27, No. 2, 1993.

"Monolithic Accelerometer With Signal Conditioning" Analog Devices Publication.

Primary Examiner—Helen C. Kwok
(74) Attorney, Agent, or Firm—Hall, Priddy, Myers & Vande Sande

(57) ABSTRACT

An accelerometer having a substrate with a cavity therein, a heater extending over the cavity, a pair of temperature sensitive elements extending over the cavity equidistant from the heater, and an electrical conductor couplable to an external power source and operative to pass electrical current through the heater so as to develop a symmetrical temperature gradient in the fluid extending outwardly from the heater to the two temperature sensors. The fluid may be a liquid or a gas surrounding the heater and temperature sensors. Applied acceleration disturbs this symmetry and produces a differential temperature between the two temperature sensors proportional to the acceleration.

26 Claims, 11 Drawing Sheets

U.S. PATENT DOCUMENTS

| | | |
|---|---|---|
| 4,472,239 | 9/1984 | Johnson et al. . |
| 4,478,076 | 10/1984 | Bohrer . |
| 4,478,077 | 10/1984 | Bohrer et al. . |
| 4,487,063 | 12/1984 | Hopper . |
| 4,501,144 | 2/1985 | Higashi et al. . |
| 4,502,325 | 3/1985 | Klomp . |
| 4,522,058 | 6/1985 | Ewing . |
| 4,528,499 | 7/1985 | Traub . |
| 4,542,650 | 9/1985 | Renken et al. . |
| 4,548,078 | 10/1985 | Bohrer et al. . |
| 4,581,928 | 4/1986 | Johnson . |
| 4,624,137 | 11/1986 | Johnson et al. . |
| 4,624,138 | 11/1986 | Ono et al. . |
| 4,627,279 | 12/1986 | Ohta et al. . |
| 4,637,253 | 1/1987 | Sekimura et al. . |
| 4,651,564 | 3/1987 | Johnson et al. . |
| 4,677,850 | 7/1987 | Miura et al. . |
| 4,680,963 | 7/1987 | Tabata et al. . |
| 4,682,496 | 7/1987 | Miura et al. . |
| 4,685,324 | 8/1987 | Bourdon et al. . |
| 4,685,331 | 8/1987 | Renken et al. . |
| 4,686,856 | 8/1987 | Vavra et al. . |
| 4,693,115 | 9/1987 | Tokura et al. . |
| 4,693,116 | 9/1987 | Miura et al. . |
| 4,703,661 | 11/1987 | Evers . |
| 4,735,086 | 4/1988 | Follmer . |
| 4,739,651 | 4/1988 | Smith . |
| 4,739,657 | 4/1988 | Higashi et al. . |
| 4,742,710 | 5/1988 | Porth et al. . |
| 4,742,711 | 5/1988 | Porth et al. . |
| 4,744,246 | 5/1988 | Busta . |
| 4,864,855 | 9/1989 | Shiraishi et al. . |
| 5,438,871 | 8/1995 | Hosoi et al. . |
| 5,553,497 | 9/1996 | Doi et al. . |
| 5,581,034 * | 12/1996 | Dao et al. .......................... 73/514.09 |
| 5,641,903 | 6/1997 | Shinotuka et al. . |
| 5,719,333 | 2/1998 | Hosoi et al. . |
| 5,786,744 | 7/1998 | Nishio et al. . |
| 5,808,197 * | 9/1998 | Dao .................................. 73/514.09 |

* cited by examiner

ACCELEROMETER WITHOUT PROOF MASS

RELATED APPLICATIONS

The present application is a continuation-in-part of U.S. patent application Ser. No. 08/673,733 filed Jun. 26, 1996 and both the present application and its latter parent are related to a disclosure document filed Aug. 8, 1994, to a CPA filed Oct. 21, 1998 of U.S. patent application Ser. No. 08/673,733 and to U.S. patent application Ser. No. 08/800,588 filed Feb. 18, 1997 which is another continuation-in-part of U.S. patent application Ser. No. 08/673,733.

FIELD

The present invention relates to an accelerometer of a type having no proof or inertial mass and no moving parts or parts under stress such as piezo or strain gauge accelerometers.

BACKGROUND

Accelerometers find use in widely diverse applications including automobile air bags and suspension systems, computer hard disc drivers, smart detonation systems for bombs and missiles and machine vibration monitors. Silicon micromachined acceleration sensors are beginning to replace mechanical acceleration switches. Present accelerometers are all based upon the classical Newtonian relationship of force, F, mass, m, and acceleration, a, in which F=ma. Thus, for a cantilevered beam, the force due to acceleration causes the beam to deflect. This deflection is sensed either by sensing the change in piezo resistors or by a change in capacitance. Such systems are not stable over wide temperature ranges and have a response which peaks due to insufficient mechanical damping.

One form of accelerometer made by bulk micromachining consists of a membrane or diaphragm of silicon formed by chemical etching having a large mass of silicon at the centre and tethers of thin film piezo-resistors, whose resistance is sensitive to strain and deformation, suspending the mass. Vertical acceleration causes the large silicon mass to move, deforming the diaphragm and changing the resistance of the piezo-resistors. Such bulk micromachined devices are large by integrated circuit standards and consistent with semiconductor circuit fabrication techniques, requiring the signal conditioning to be off-chip.

Another system made by surface micromachining, is based on a differential capacitor. Surface micromachining creates much smaller, more intricate and precisely patterned structures than bulk micromachining. It involves the same process that is used to make integrated circuits, namely, depositing and etching multiple thin films and layers of silicon and silicon-oxide to form complex mechanical structures. In this case a central beam is affixed in an "H" configuration with the spaced apart parallel arms of the "H" supporting respective ends of the cross beam.

A plate affixed perpendicular to the beam forms a moving capacitor plate that is positioned between two fixed plates, thus, forming two capacitors sharing a common moving plate. When the unit is subjected to an accelerating force the beam and hence moving plate moves closer to one of the fixed plates and away from the other fixed plate. The effect is to reduce one of the capacitors and increase the other by an amount proportional to the acceleration. The device requires proper orientation with the cross beam parallel to the direction of acceleration. However, surface micromachining is used to create a much smaller device adapted to the same techniques used to make integrated circuits. The moving capacitor plate accelerometer suffers from high noise at low frequencies and exhibits drift at low acceleration measurements.

It is an object of the present invention to provide an improved accelerometer. It is a further object of the invention to provide an accelerometer having no proof mass and a corresponding increase ruggedness.

SUMMARY OF THE INVENTION

According to the invention there is provided an accelerometer having a substrate with a cavity therein, a heater and a pair of sensor wires extending across the cavity with the sensor wires equidistant from the heater and on either side thereof.

Preferably the substrate is silicon and the cavity, heater and sensor wires are made by micromachining.

The means for passing electrical current through the heater so as to develop a symmetrical temperature gradient extending outwardly from the heater to the two temperature sensors.

The heater and sensors may be polysilicon. Alternatively they may be a thin film of metal. A suitable metal may be selected from the group consisting of nickel, chromium or platinum Advantageously, there may be provided means for measuring the differential resistance of the temperature sensors.

Means may also be provided to convert the differential temperature measurement to an acceleration value.

An auxiliary heater may be formed on each side of the heater and symmetrically disposed with respect to the heater.

The invention herein disclosed provides an accelerometer which comprises a primary heater micromachined so as to extend in a first direction and a pair of temperature sensing elements micromachined so as to be substantially parallel to the primary heater and located on opposite sides of the heater.

Preferably, the pair of temperature sensing elements are each on opposite sides of and equally spaced from the primary heater. The primary heater and temperature sensing elements may be elongated rectangular strips.

BRIEF DESCRIPTION WITH REFERENCE TO THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

Figure 16:
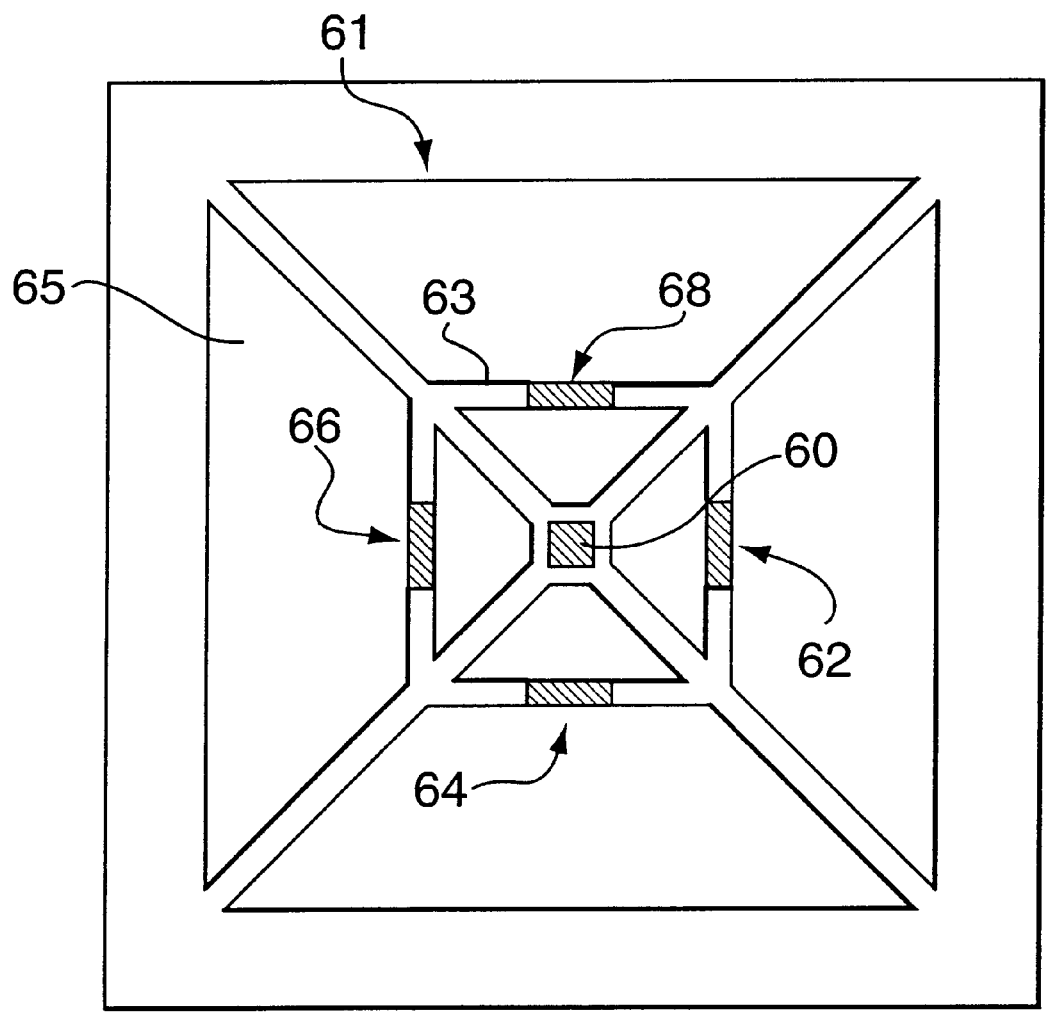

FIGS. 15-a, 15-b, 15-c, and 15-d depict the surface micromachining process by which a conductive surface feature is imparted onto the silicon wafer and then it is further processed to become a bonding pad or a thermal couple junction; and FIG. 16 is a top view of a thermal accelerometer effective to measure acceleration along two perpendicular directions.

DETAILED DESCRIPTION WITH REFERENCE TO THE DRAWINGS

Figure 1:
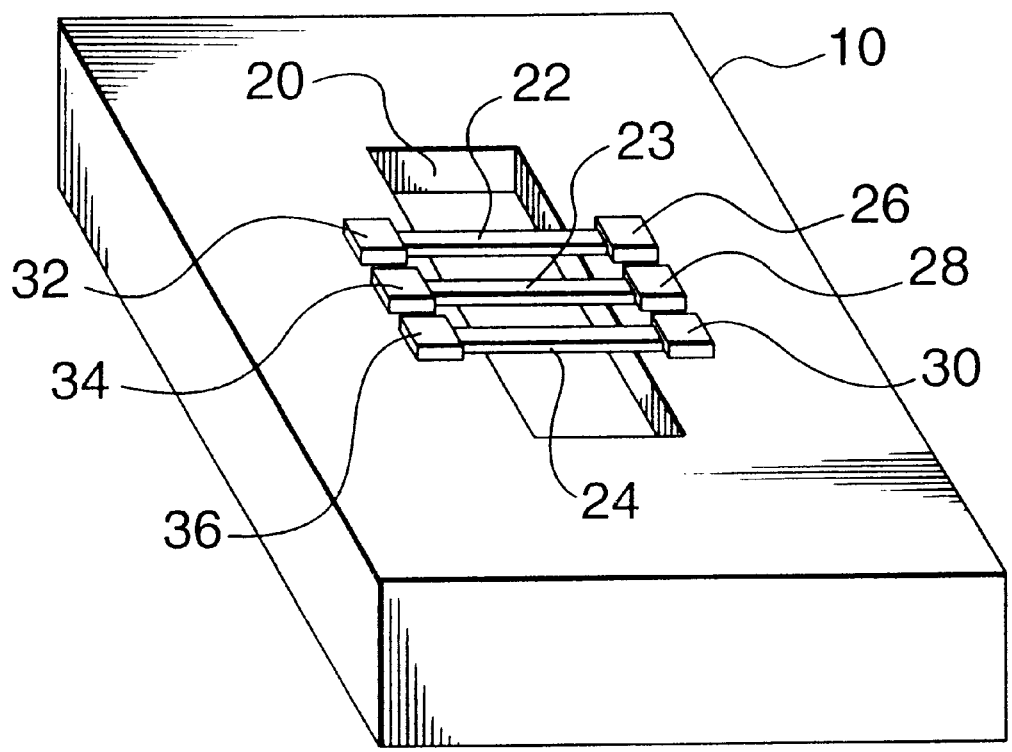
FIG. 1 is a perspective view of a preferred embodiment of the accelerometer.
Figure 2:
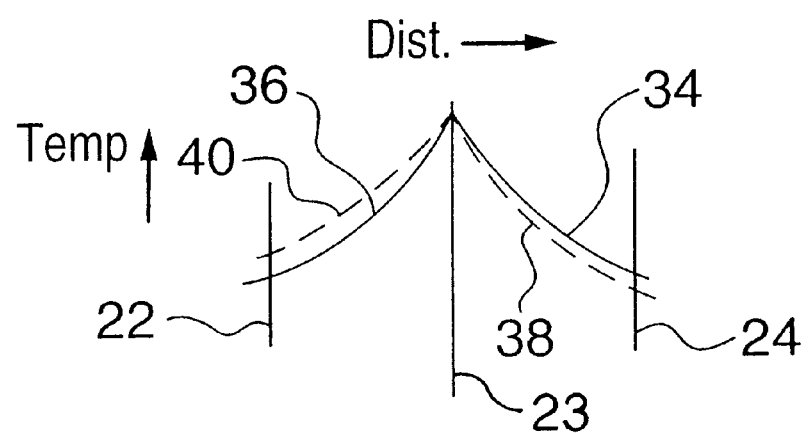
FIG. 2 is a graph showing the normal temperature gradient and the temperature gradient shift due to acceleration.

Referring to FIG. 1 the accelerometer is formed on a silicon substrate 10 in which a cavity 20 is formed underneath a central heater 23 and sensors 22 and 24 positioned at equal distances from the heater 23 on either side thereof. Wire bonding pads 28 and 34 are formed on either end of the heater 23 to provide electrical contact thereto. Wire bonding pads 26 and 32 are formed on either end of sensor 22 and wire bonding pads 30 and 36 are formed on either end of sensor 24 also to provide electrical contact. Electrical current is passed through the heater 23 which heats the air around it. The temperature gradient established is shown by the solid lines 34 and 36 in FIG. 2. Resistive temperature sensors 22 and 24 are used to measure the temperature of the surrounding air. The distance between the heater 23 and each sensor is about 20 microns while heater 23 is 10 to 15 microns. The length of the heater 23 and sensors 22 and 24 is approximately 2000 microns. However, other dimensions may be selected depending upon the desired specifications of operation.

With the sensors 22 and 24 equidistant from the heater 23 the differential temperature between the sensors 22 and 24 will be zero. If the substrate 10 is subjected to an accelerating force in a direction perpendicular to the heater 23 but along the surface of the substrate, the temperature distribution of the air will shift as shown in the dotted lines 36 and 38. In this case sensor 22 will experience an increase in temperature whereas sensor 24 will detect a reduced temperature, giving a net non-zero differential temperature measurement between the sensors 22 and 24 of a magnitude which is proportional to acceleration.

Figure 3:
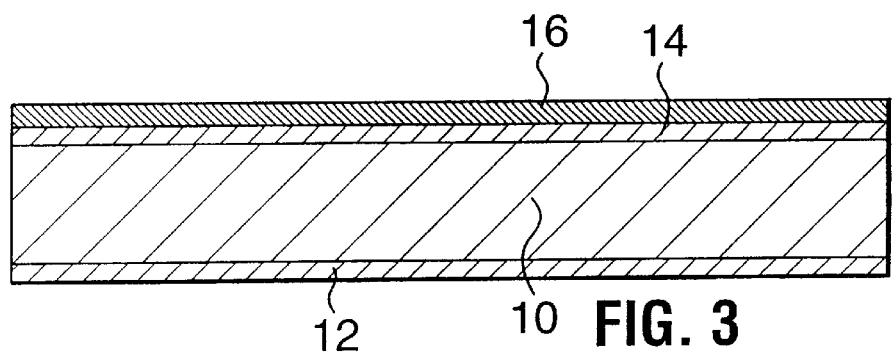
FIGS. 3 to 6 are sectional views showing the steps in fabricating the device of FIG. 1.
Figure 4:
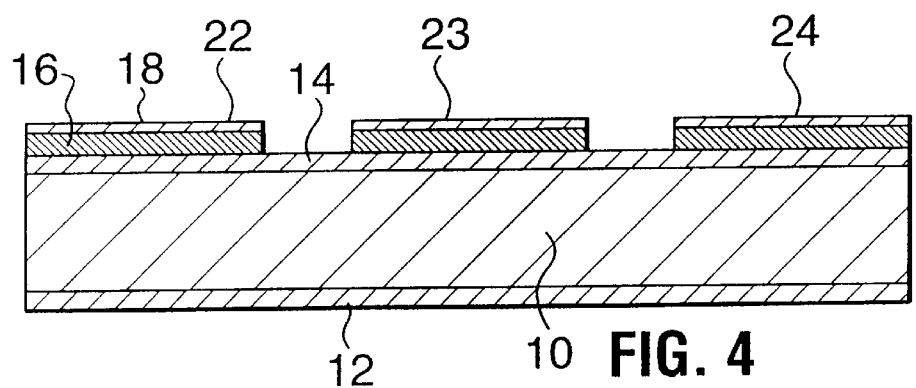

Referring to FIG. 3, the silicon wafer 12 is n-type. Thermal oxidation at 1,100° C. produces a layer of silicon dioxide 14 0.5 μm thick. On top of the layer of silicon dioxide 14 a layer of polysilicon 16 0.8 μm is deposited. The polysilicon layer 16 is lightly doped to increase its electrical conductivity. Following this doping, another oxidation step is used to develop a 0.5 μm thick layer of silicon dioxide 18 on top of the polysilicon 16 reducing the thickness of the polysilicon layer to 0.5 μm. Standard photolithographic techniques are used to pattern the silicon dioxide layer 18 over the polysilicon 16 as seen in FIG. 4. The silicon dioxide 18 is used as an etch mask for the removal of exposed polysilicon using ethylenediamine-pyrocatechol-water (EDP) mixture as an etchant at 85° C. Oxide 14 underneath the polysilicon 16 protects the silicon substrate 10 during etching. The resulting structure after etching shown in FIG. 4 defines three polysilicon bridges that are used as the heater 23 and the two sensors 22 and 24.

Figure 5:
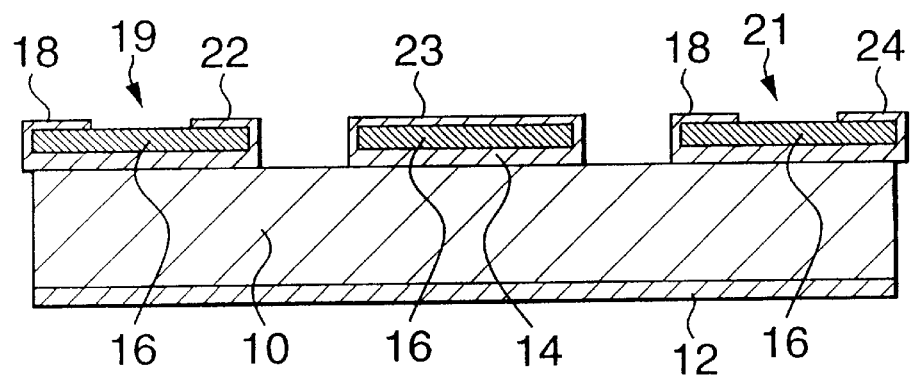
Figure 6:
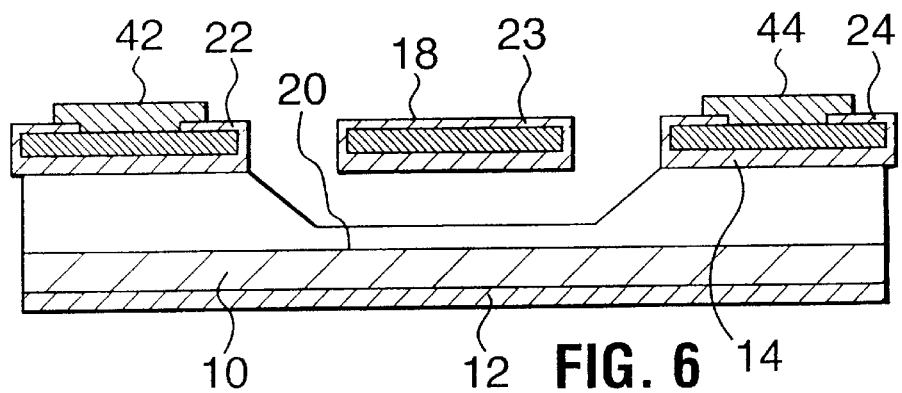

Another oxidation step produces oxide on the side walls of the polysilicon 16 to protect it from a later silicon etch. The oxide layers above and below the polysilicon layer 16 are patterned to create openings for the bonding pads and formation of the cavity in the silicon substrate as shown in FIG. 5.

An aluminum nickel seed layer is sputtered onto the wafer and photoresist is patterned so the exposed bonding pad area can be selectively plated with gold. The photoresist and seed layer are removed and the wafer is etched in EDP to create a deep cavity 20 underneath. During EDP etching of the silicon substrate 10, the polysilicon bridges 22, 23, and 24 are protected by the oxide layers and the polysilicon 16 underneath the e bonding pads 26, 28, 30, 32, 34, and 36 is protected by gold plated pads 44.

The fabrication process is compatible with CMOS and bipolar processes. This allows the accelerometer to be integrated with signal conditioning circuits.

Figure 7:
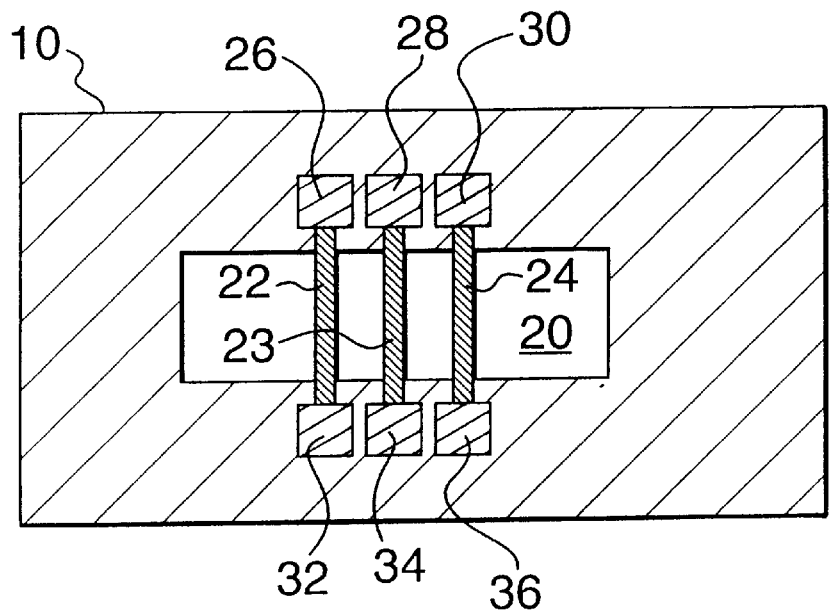
FIG. 7 is a plan view of the device.

Referring to FIG. 7, the final device consists of three elongated strips each of which consists of a layer of polysilicon sandwiched between layers of oxide 22, 23, 24 coupled to their respective bonding pads and suspended over a cavity 20. The space around the heater 23 and temperature sensors 22 and 24 is filled with either a fluid or a gas. Although polysilicon has been described as the material of which the heater 23 and sensors 22 and 24 are made, thin film metal resistors such as nickel, chromium or platinum can be used.

Figure 8:
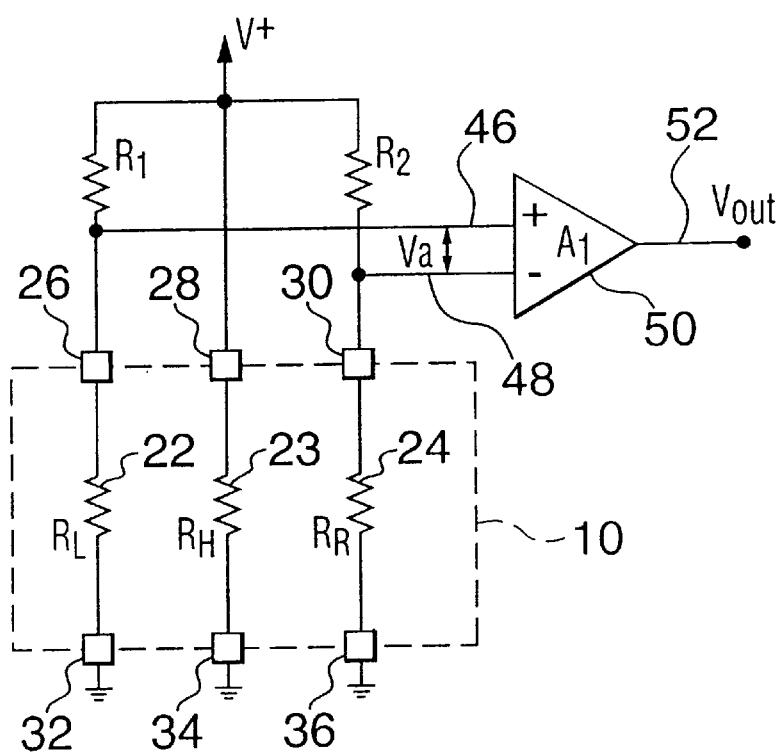
FIG. 8 is a schematic diagram of the circuitry used with the accelerometer.

Heater 23 is used in a bridge circuit formed by resistors R1, R2, $R_L$, and $R_R$ shown in FIG. 8. The junctions of the bridge are sampled by lines 46 and 48 and fed into the input of a differential amplifier 50 which provides an output on line 52. When acceleration is applied, the balance of the bridge is disturbed causing a differential voltage to be applied to the amplifier 50. The amplifier 50 converts the differential signal to a single-ended voltage at its output on line 52. With R1=R2, and no acceleration, $V_a$=0. When acceleration is applied this balance is disturbed and the differential voltage $V_a$ is amplified and converted into a single-ended signal by the differential amplifier 50.

Although micromachining was described as the technology used to produce this accelerometer, there are other low cost manufacturing technologies that can also be used. In order to maximize the differential temperature change of the sensors 22 and 24 the direction of acceleration is perpendicular to the heater 23 and along the surface of the substrate 10, Acceleration perpendicular to the surface of the substrate will cause a shift in the temperature gradient but will affect each sensor in the same way. However, a measurement of the change in the temperature of each sensor will allow a determination of the temperature change of each sensor 22 and 24.

Figure 9:
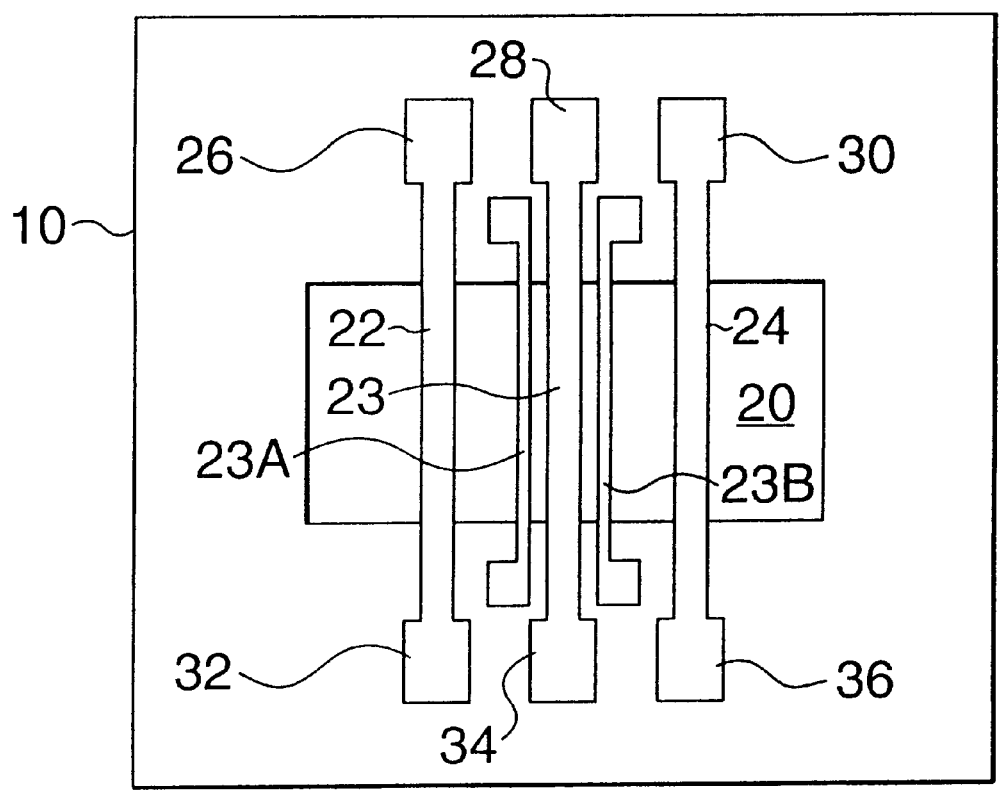
FIG. 9 is a top or plan view of the device incorporating two auxiliary heaters for self-testing.

Referring to FIG. 9, a self-testing capability can be implemented by the addition of two auxiliary heaters 23A and 23B, one on each side of main heater 23. In normal operation, all three heaters 23, 23A, and 23B are powered to produce a symmetrical temperature gradient which is disturbed only by acceleration. By switching off one of the auxiliary heaters 23A or 23B, this symmetrical temperature gradient is disturbed. For example, when auxiliary heater 23A is switched off, the point of symmetry of the temperature gradient will shift from the center of heater 23 towards sensor 24 without application of an acceleration. This change will produce an output to indicate that the accelerometer's function is intact. Switching off heater 23B has a similar effect but in the opposite direction. Instead of cutting off the current completely, a more elaborate testing can be done by controlling the amount of current reduction to anywhere between 0 and 100%.

Obviously, two or three accelerometers oriented at right angles to each other could be used to sense acceleration in two dimensions or three dimensions, respectively, rather than having to orient the accelerometer in the direction of the acceleration.

A thermal accelerometer capable of detecting acceleration in 2 axes can be produced using the same principle as above. Illustrated in FIG. 16 is the top view of a 2-axes thermal accelerometer 61. It consists of a suspended structure 63 over an etched cavity 65. At the center of this suspended structure is a small heater plate 60 which generates a symmetrical temperature gradient in both the X and Y axes. Four temperature sensors, 62, 64, 66 and 68 are placed at equal distance from the heater plate. When acceleration is applied to the device in the X direction, differential temperature is registered only by 62 and 66, producing an output. Similarly when acceleration is applied to the device in the Y direction, differential temperature is registered only by 68 and 64.

Figure 10:
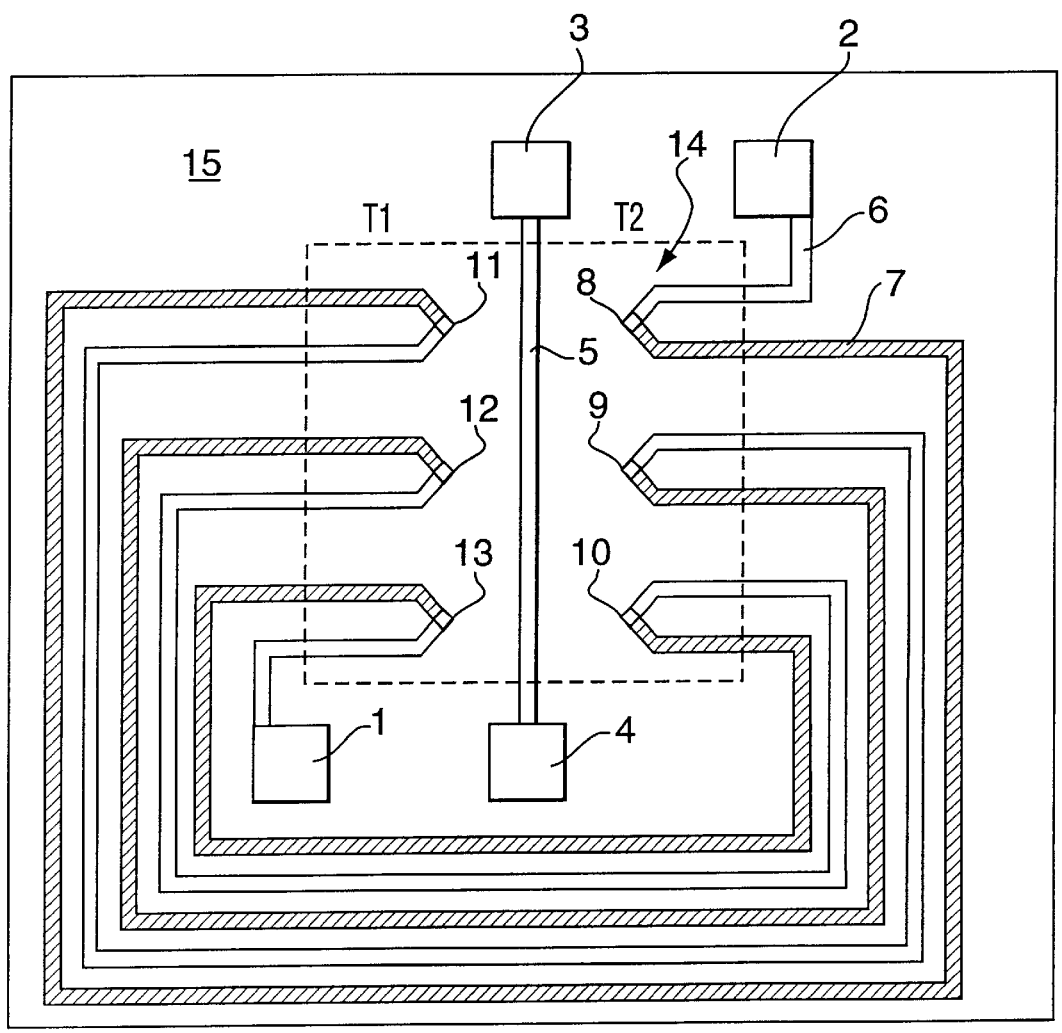
FIG. 10 depicts a first embodiment of the invention showing an arrangement of thermalpiles (linearly oriented thermalcouple arrays) spaced symmetrically on either side of a cavity.

Referring to FIG. 10, the accelerometer is formed on a silicon substrate 15 in which a cavity 14 is formed. A central primary heater 5 and two thermalpiles span the cavity. The thermalpiles are arrays of thermalcouple junctions (8, 9, 10 and 11, 12, 13) positioned at equal distances from the primary heater 5 on either side thereof and oriented substantially parallel to the primary heater 5. The distance between the primary heater 5 and each of the thermalcouple junction arrays is about 20 microns, while the primary heater 5 is about 10 to 15 microns in width. The length of the primary heater 5 is in the neighborhood of 2000 microns. However, other dimensions may be selected depending upon the desired specifications of operation. Bonding pads 3 and 4 are positioned on either end of the primary heater 5 to provide electrical contact thereto. Bonding pads 1 and 2 are also formed at the ends of the thermalcouple junction arrays (8, 9, 10 and 11, 12, 13) to provide electrical contact. FIG. 10 (and all of the other drawings in this application) depict the thermalpiles with a small number of thermalcouple junctions, but, in practice, a significantly greater number of thermalcouple junctions (usually 10 or more) are used for each thermalpile to increase the temperature measuring sensitivity of the device.

During operation, electrical current from an external source (not shown) is passed through the primary heater 5 via bonding pads 3 and 4. The primary heater 5 warms the air around it, forming a temperature gradient 36 shown in FIG. 14. The thermalpiles on either side of the primary heater 5 are used to measure the temperature of the surrounding air.

A thermalpile is an array of thermalcouple junctions, and each thermocouple is a combination of two different conductors (or semiconductors) 6 and 7, which produces a potential difference at the junction between the two materials. The potential generated is proportional to the temperature at the junction. At a given temperature (T), each of the thermalcouple junctions 8, 9, 10, 11, 12, 13 will produce an electrical potential (V) given by the expression: $V=\alpha_s T$ where $\alpha_s$ is the Seeback coefficient. Materials with a positive contribution to the Seeback coefficient should be used for the first material 6, so as to maximize the sensitivity of the junction. Such materials include: p-doped polysilicon, antinomy, chrome, gold, copper, silver and others. Conversely, materials with a negative contribution to the Seeback coefficient such as: n-doped polysilicon, lead, aluminum, platinum, nickel, bismuth and others should be employed for material 7.

Multiple thermalcouple junctions 8, 9, 10, 11, 12, 13 are positioned on either side of the cavity 14, forming thermalpiles with linear orientations that are equidistant from and substantially parallel to the primary heater 5. Electrically, the thermalcouple junctions 8, 9, 10, 11, 12, 13 are connected in series with opposing polarity on either side of the primary heater 5. The resulting voltage measured across bonding pads 1 and 2 is a signal which represents the difference in temperature between the two thermalpiles.

For the configuration shown in FIG. 10, the output voltage between bonding pads 1 and 2 ($V_{2,1}$) will be the sum of the voltages developed across junctions 8, 9, and 10 minus the sum of the voltages developed across junctions 11, 12, and 13. In other words:

$$V_{2,1}=V_8+V_9+V_{10}-(V_{11}+V_{12}+V_{13})$$

where $V_i$ is the voltage at function i $$V_{2,1}=\alpha_s(T_8+T_9+T_{10}-T_{11}-T_{12}-T_{13})$$

where $T_i$ represents the temperature at a junction i. Assuming now that the primary heater 5 creates a symmetrical temperature distribution, then
$T_2=T_8=T_9=T_{10}$ and $T_1=T_{11}=T_{12}=T_{13}$
and so, more generally, $$V_{2,1}=N\alpha_s(T_2-T_1)$$

where N is the number of thermalcouple junctions in each thermalpile.

Figure 11:
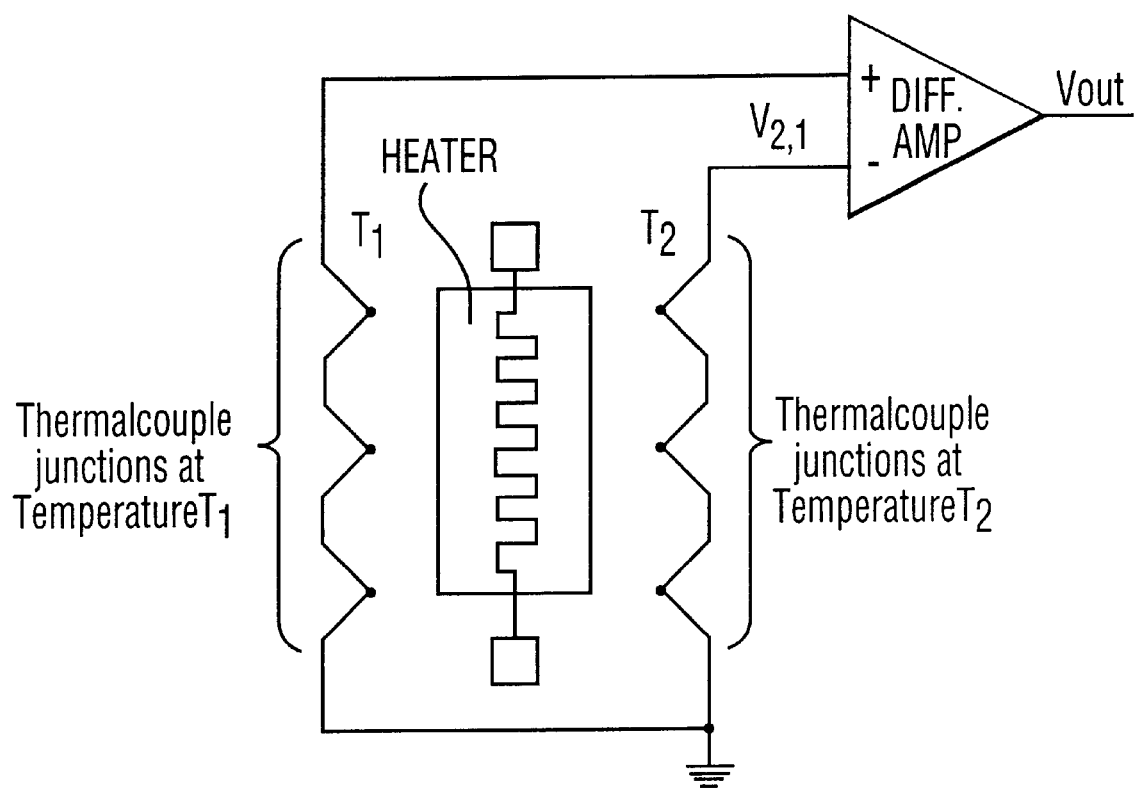
FIG. 11 depicts the overall system showing the amplifier which amplifies the differential signal from the thermalpiles.
Figure 14:
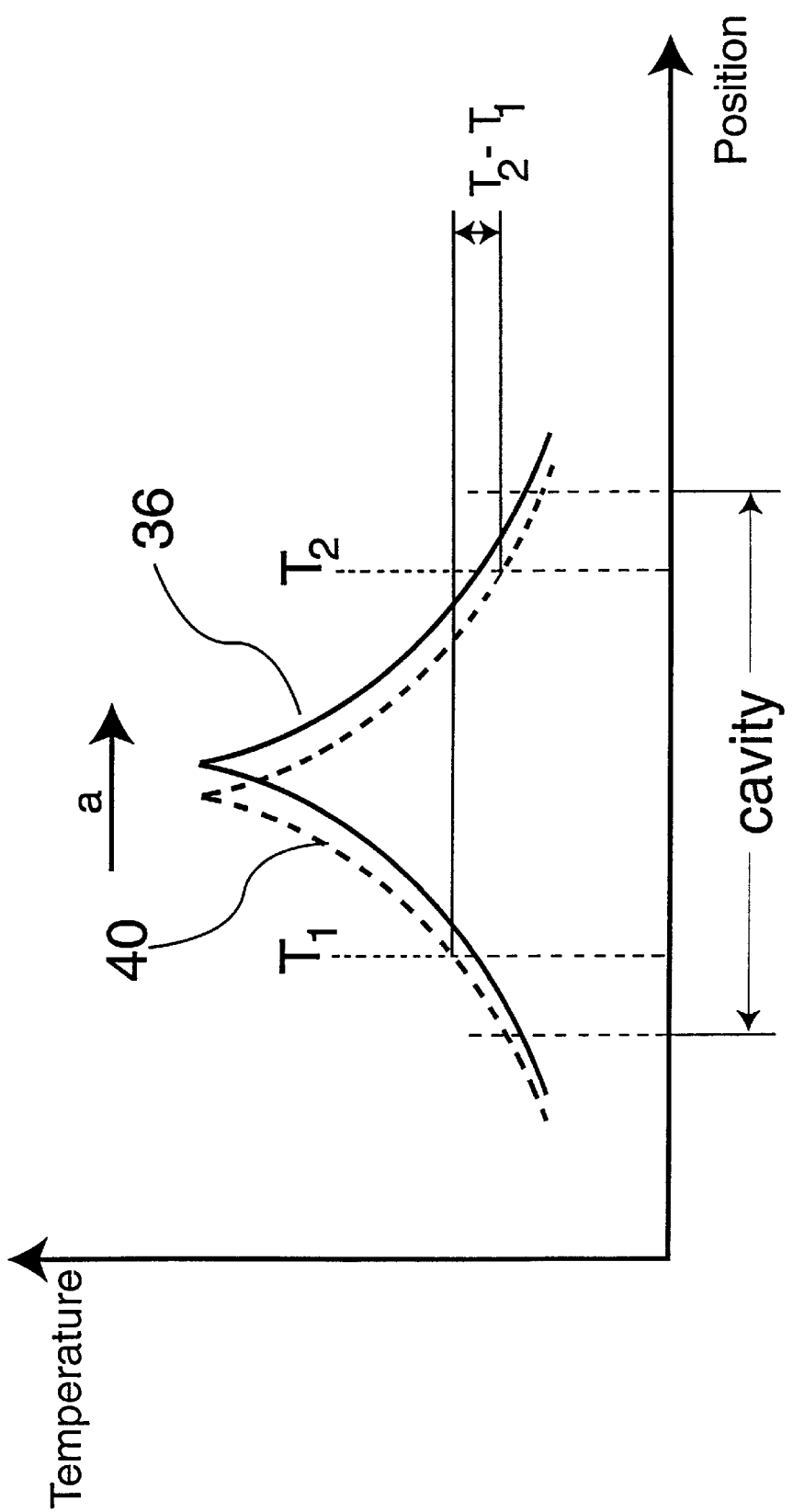
FIG. 14 depicts the temperature gradient in the cavity caused by the primary heater carrying current. Also shown is the shifted temperature gradient, which occurs when the sensor is accelerated.
Figure 15A:
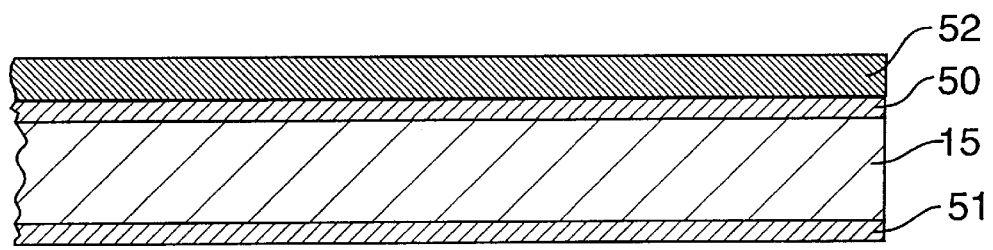
Figure 15B:
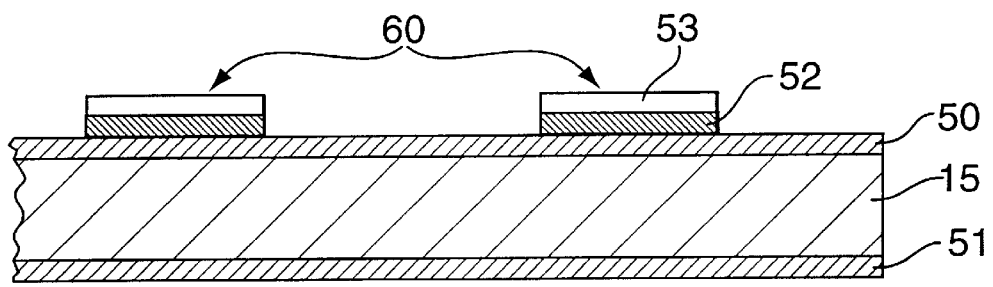
Figure 15C:
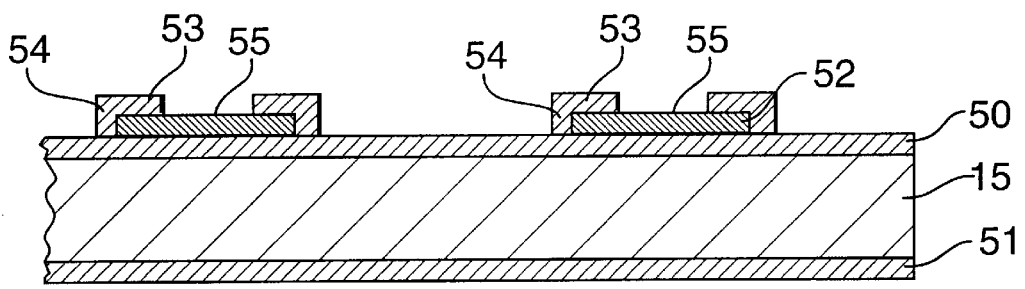
Figure 15D:
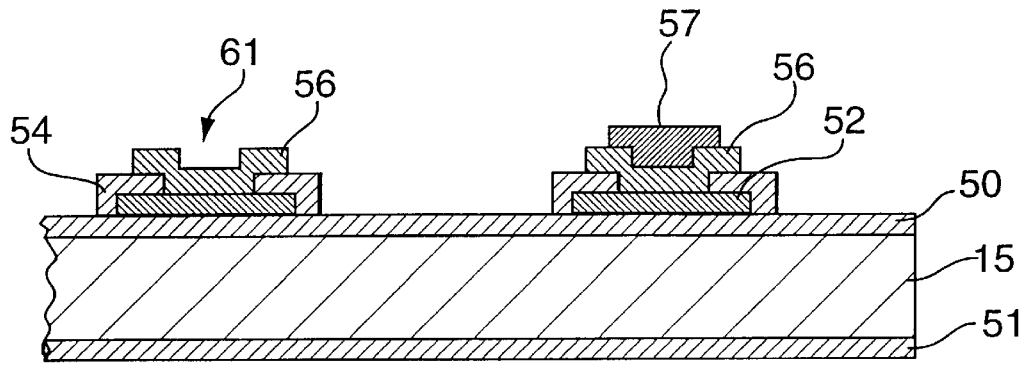

Referring to FIGS. 10 and 14, under normal conditions (i.e. no acceleration), the temperature distribution 36 in the cavity will be symmetric about the primary heater 5 and $T_1$ will equal $T_2$, forcing $V_{2,1}$ to zero. However, if there is an acceleration of the device, then the temperature gradient 40 in the cavity will be shifted slightly and $V_{2,1}$ will be non-zero. Over a range of accelerations, the shift in the temperature distribution and thus, the differential voltage ($V_{2,1}$), is proportional to the acceleration of the device. FIG. 11 shows how this differential voltage signal $V_{2,1}$ can be amplified to produce an output voltage ($V_{out}$), which is proportional to the acceleration of the device.

Figure 12:
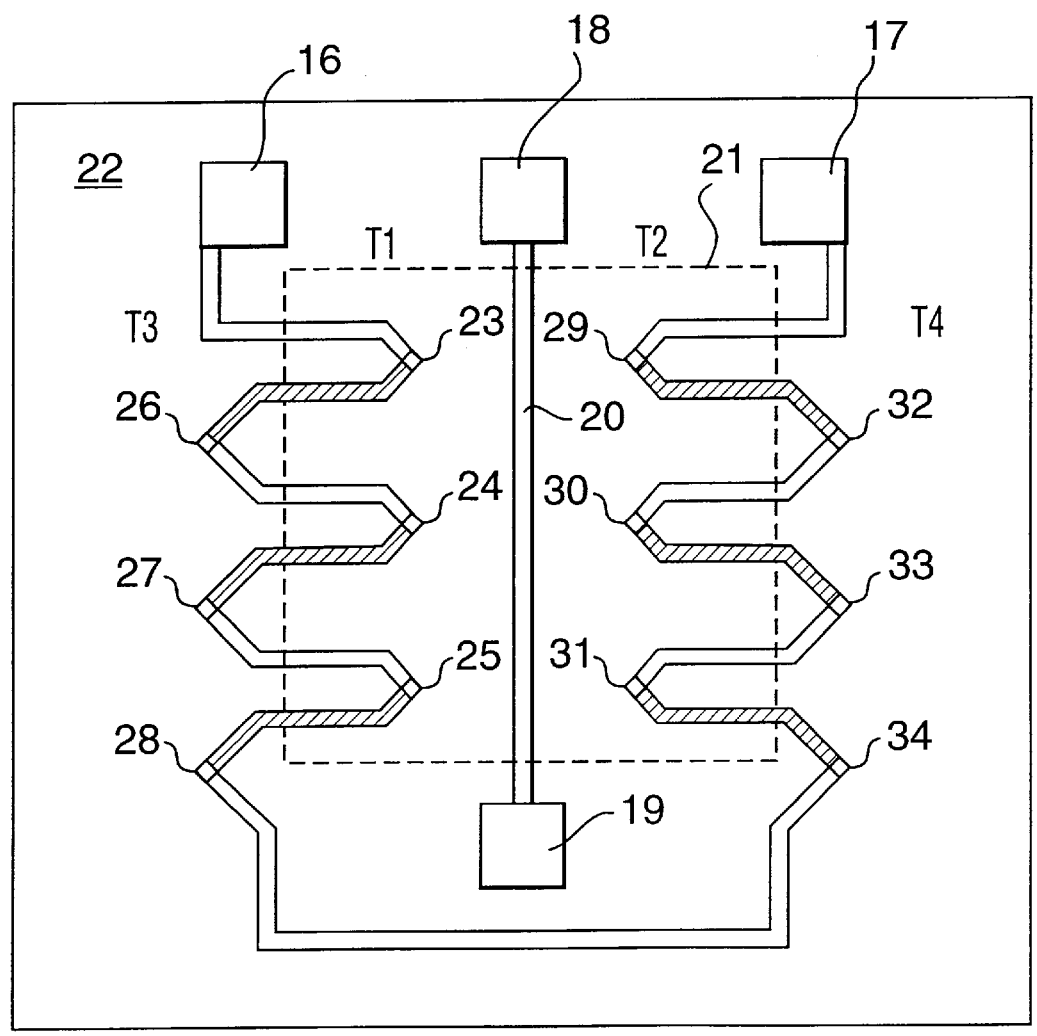
FIG. 12 depicts a second embodiment of the invention showing an alternative arrangement of thermalpiles spaced symmetrically on either side of a cavity.
Figure 13:
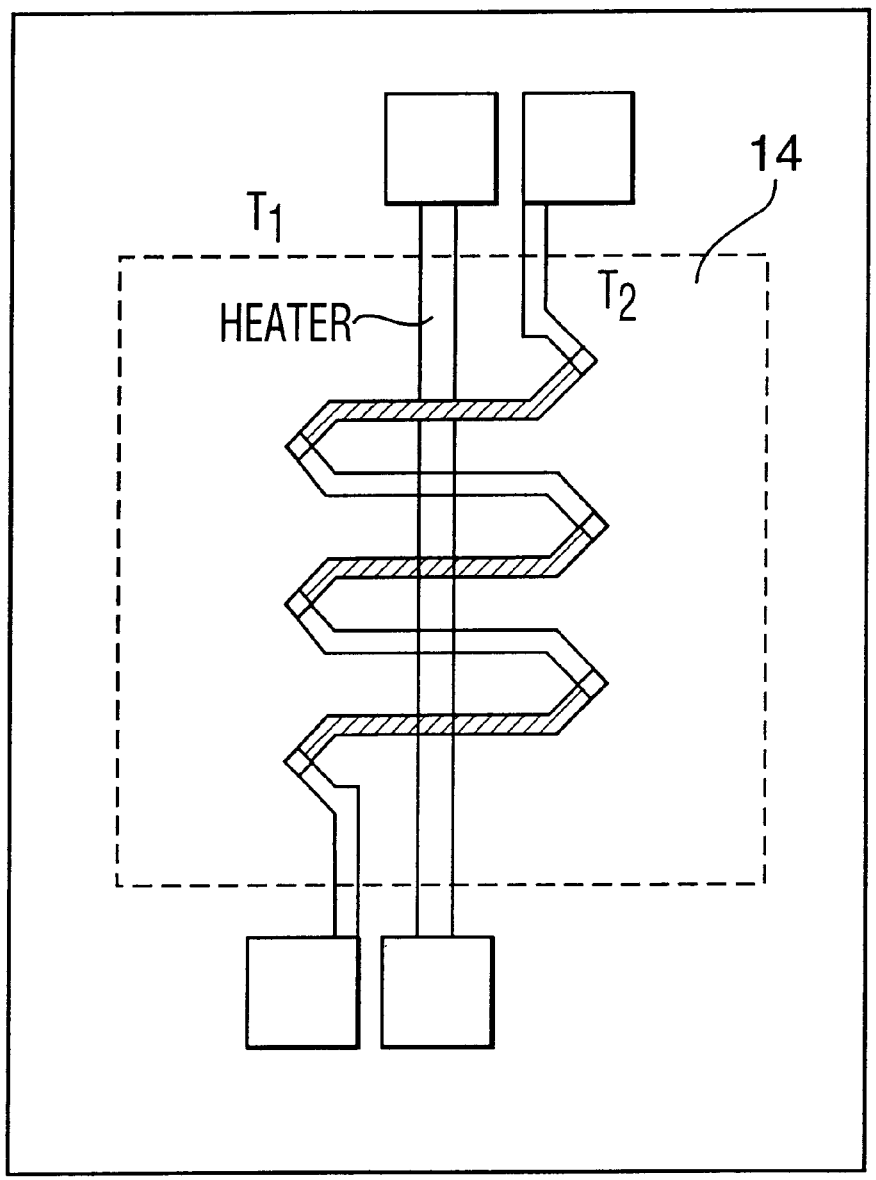
FIG. 13 depicts a third embodiment of the invention showing another alternative arrangement of thermalpiles spaced symmetrically on either side of a cavity.

When the number of thermalcouples in the device is increased, the routing of conductive materials shown at the bottom of FIG. 10 can become prohibitive. Alternative embodiments which help to reduce this routing problem are depicted in FIGS. 12 and 13. Referring now to FIG. 12, the general equation relating the output voltage $V_{2,1}$ is given by:

$$V_{2,1}=V_{28}+V_{30}+V_{31}-V_{32}-V_{33}-V_{34}+V_{26}+V_{27}+V_{28}-V_{23}-V_{24}-V_{25}$$

or more generally, $$V_{2,1}=N\alpha_s(T_2+T_3-T_1-T_4)$$

where N is the number of thermalcouple junctions in each of the four thermalpiles. Since the junctions 26, 27, 28, 32, 33, and 34 are on the silicon substrate 15 which has good thermal conductivity, $T_3$ and $T_4$ should both remain at the substrate temperature, leaving $$V_{2,1}=N\alpha_s(T_2-T_1)$$

Referring now to FIG. 13, a third configuration is shown, wherein the output voltage $V_{2,1}$ is given by:

$$V_{2,1}=V_{41}+V_{42}+V_{43}-V_{44}-V_{45}-V_{46}$$

$$V_{2,1}=N\alpha_s(T_2-T_1)$$

where N is the number of thermalcouple junctions in each of the thermalpiles in the cavity 14.

To minimize the heat conduction from the primary heater to the thermalcouple junctions, thin (less than 0.5 micron) and narrow structures are used to support the thermalpile. The configuration shown in FIG. 13 has the advantage of having the shortest conductor path, resulting in the lowest source resistance and thermal noise.

Several other features may be included in the device which are not shown in the diagrams. A pair of auxiliary heaters may be added on each side of the primary heater between the primary heater and the thermalpiles. These auxiliary heaters may have current passed through them so as to produce an asymmetric temperature distribution. The asymmetric temperature distribution will affect $V_{2,1}$ because of the differential temperature measured by each thermalpile. elaborate testing can be carried out by varying the current flow to the auxiliary heaters between 0–100% to ensure the proper functionality of the device.

Another embodiment, not depicted in the drawings, involves making absolute (rather than differential) voltage measurements for each of the thermalpiles on either side of the cavity and then using external electronics to achieve the differential signal. For example, referring to FIG. 10, the voltage from thermalcouple junctions 8, 9, and 10 can be determined, $$V_2=V_8+V_9+V_{10}=\alpha_s(T_8+T_9+T_{10})=N\alpha_sT_2 \text{ (applying all previous assumptions)}$$

and the voltage across thermalcouple junctions 11, 12, and 13 can be determined, $$V_1=N\alpha_sT_1$$

After having determined $V_1$ and $V_2$, the differential voltage $V_{2,1}$ may be calculated using external circuitry such as a difference amplifier, $$V_{2,1}=N\alpha_s(T_2-T_1)$$

Obviously, two or three accelerometers oriented at right angles to each other could be used to sense acceleration in two or three dimensions respectively. Use of multiple accelerometers would eliminate having to orient the accelerometer in the direction of the acceleration. FIGS. 15-a and 15-b depict the surface micromachining process by which a conductive surface feature 60 is imparted onto the silicon wafer 15. Referring to FIG. 15-a, the silicon wafer 15 is n-type. Thermal oxidation at approximately 1,100° C. produces layers of dielectric silicon dioxide 50 and 51 on either side of the substrate 15, which are approximately 0.5 microns thick. A layer of 0.8 micron thick polysilicon 52 is then deposited on top of the dielectric oxide layer 50. The polysilicon layer 52 is lightly doped to increase its electrical conductivity.

As shown in FIG. 15-b, a second oxidation step is used to produce another 0.5 micron oxide layer 53 in selected areas. The silicon oxide layer 53 reduces the thickness of the polysilicon layer 52 to 0.5 microns in those areas. Standard photolithographic techniques are employed to pattern the second oxide layer 53, so that it is only deposited on the desired areas. the patterned silicon dioxide layer 53 is then used as an etch mask to pattern the polysilicon layer 52 underneath. Exposed polysilicon from layer 52 is removed by etching, leaving the conductive surface features 60.

FIGS. 15-c and 15-d depict the surface micromachining process by which a thermalcouple junction 61 is formed from a conductive surface feature 60 (see FIG. 15-b). A third oxidation step is used to impart side walls 54 onto the exposed polysilicon layer 52. A second lithographic step is used to open windows 55 on the top oxide layer 53 for thermalcouple contact and bonding pad area. A window for the cavity (not shown) may also be opened in this lithographic step. A layer of nickel 56 is deposited on the wafer in selected areas. The nickel 56 and the polysilicon 52 become a thermalcouple junction 61. Selective plating can also be used to form a bonding pad 57 for electrical connection.

A final processing step involves the etching of the silicon substrate 15 to produce a cavity (not shown). Tetramethylammonium hydroxide (TMAH) etchant is ideal for this application because silicon dioxide and many thin film metals such as nickel, chromium, gold etc. are resistive to this etchant.

The technique for micromachining the accelerometer structure is compatible with both CMOS and bipolar processes allowing the accelerometer to be integrated with signal conditioning circuits.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

I claim:

1. An accelerometer, comprising:
    (a) a substrate having an open space therein;
    (b) a heater extending across said open space;
    (c) a pair of temperature sensitive elements extending across said open space, said temperature sensitive elements being located on opposite sides of said heater; and
    (d) an enclosure extending over said open space including said heater and said temperature sensitive elements and enclosing a non-solid heat transfer medium surrounding said heater and said temperature sensitive elements;
    wherein said open space, said heater and said temperature sensitive elements are formed by micromachining.

2. An accelerometer according to claim 1, wherein said temperature sensitive elements are parallel to and equidistant from and located on opposite sides of said heater.

3. An accelerometer according to claim 1, wherein said heat transfer medium is selected from the group consisting of a fluid or a gas.

4. An accelerometer according to claim 1, including an electrical conductor connectable to an external source of power operative to conduct electric current through said heater so as to develop a symmetrical temperature gradient extending outwardly from said heater on either side thereof.

5. An accelerometer according to claim 1, wherein said heater and said temperature sensitive elements are metal.

6. An accelerometer according to claim 1, including a bridge circuit operative to measure the differential resistance of said temperature sensitive elements.

7. An accelerometer according to claim 1, wherein said heater and said temperature sensitive elements are coated with silicon dioxide.

8. An accelerometer according to claim 1, including a pair of auxiliary heaters symmetrically disposed on either side of and spaced from said heater.

9. An accelerometer, comprising:
   a substrate having an open space therein;
   a primary heater extending across said open space;
   a pair of temperature sensitive elements extending across said open space, substantially parallel to and equidistant from said primary heater, one of said pair being located on each side of said primary heater;
   an enclosure extending over said open space, said primary heater, said temperature sensitive elements and a non-solid heat transfer medium surrounding said primary heater and said temperature sensitive elements;
   a conductor connectable to an external source of power and operative to conduct current through said primary heater so as to develop a symmetrical temperature gradient in an air surrounding said primary heater in which air temperature lowers in a direction away from said primary heater; and
   a bridge circuit operative to measure the differential resistance of said temperature sensitive elements and relating that to acceleration in a direction transverse to said temperature sensitive elements and along a surface of said substrate; and
   wherein said accelerometer is made by micromachining.

10. An accelerometer according to claim 9, wherein said primary heater and said temperature sensitive elements are polysilicon.

11. An accelerometer according to claim 9, wherein said substrate is silicon.

12. An accelerometer according to claim 9, including an auxiliary heater symmetrically positioned on each side of and spaced from said primary heater.

13. An accelerometer according to claim 12, wherein said auxiliary heaters are intermediate said temperature sensitive elements and said primary heater.

14. An accelerometer according to claim 13, including conductive lines coupled to said auxiliary heaters and to an external source of power and operative to permit independent changing of current through each of said auxiliary heaters.

15. An accelerometer according to claim 9, wherein said open space is a cavity.

16. An accelerometer according to claim 9, wherein temperature sensitive elements are thermopiles,
   said thermopiles arranged linearly and in a first direction substantially parallel to said primary heater and located at two positions equidistant from and on either side of said heater,
   each one of said thermopiles being operative to produce an electrical potential proportional to the temperature at one of said two positions.

17. An accelerometer according to claim 16, wherein said thermopiles are electrically connected in series and with opposite polarity, such that the electrical potential produced across the combination of both thermopiles is proportional to the difference in temperature between said two positions.

18. An accelerometer according to claim 16, which further comprises a conductive path coupled to said thermopiles and to an external meter for measuring the electrical potential produced by said thermopiles and relating that to acceleration in a second direction transverse to said temperature sensitive elements and along a surface of said substrate.

19. An accelerometer according to claim 16, including a differential amplifier coupled to said thermopiles and providing an output for measuring the electrical potential produced by said thermopiles.

20. An accelerometer according to claim 16, wherein each of said thermopiles is comprised of a plurality of thermocouples,
   each of said thermocouples being made out of a first material and a second material, which first and second materials form a thermocouple junction in a location where said first and second materials are joined, creating a plurality of thermocouple functions,
   each of said thermocouple junctions operative to produce an electrical potential proportional to the temperature at said thermocouple junction,
   said plurality of thermocouple junctions being physically arranged in a linear pattern and electrically coupled in series so as to form an array of thermocouple junctions.

21. An accelerometer according to claim 20, wherein said first and second materials are selected from the group of: conductors and semiconductors.

22. An accelerometer according to claim 9, wherein said heat transfer medium is one of a fluid and a gas.

23. An accelerometer according to claim 9, wherein said heater is made of a material selected from the group of: metal and polysilicon.

24. An accelerometer according to claim 9, wherein said heater is coated with a dielectric.

25. An accelerometer according to claim 24, wherein said dielectric is silicon dioxide.

26. An accelerometer, comprising:
   (a) a substrate having an open space therein;
   (b) a heater extending across said open space;
   (c) a first temperature sensitive element extending over said open space and spaced apart from said heater;
   (d) a second temperature sensitive element positioned to sense a temperature signal which when subtracted from a temperature signal of said first temperature sensitive element produces a differential signal proportional to acceleration; and
   (e) an enclosure extending over said open space including said heater and said first temperature sensitive element and enclosing a non-solid heat transfer medium surrounding said heater and said first temperature sensitive elements;
      wherein said open space, said heater and said first temperature sensitive element are formed by micromachining.

* * * * *